United States Patent
Hill (10) Patent No.: US 8,085,481 B2
(45) Date of Patent: Dec. 27, 2011

(54) LENS DRIVE MOTOR MOUNT

(76) Inventor: Jerry Paul Hill, Reseda, CA (US)

( * ) Notice: Subject to any disclaimer, the term of this patent is extended or adjusted under 35 U.S.C. 154(b) by 0 days.

(21) Appl. No.: 12/723,300

(22) Filed: Mar. 12, 2010

(65) Prior Publication Data

US 2010/0302655 A1     Dec. 2, 2010

Related U.S. Application Data

(60) Provisional application No. 61/269,926, filed on May 26, 2009.

(51) Int. Cl.
*G02B 7/02* (2006.01)
(52) U.S. Cl. ............... 359/818; 248/230.4; 248/229.24
(58) Field of Classification Search .............. 359/818; 248/74.1, 74.2, 218.4, 230.4, 421; 24/489; 269/218, 239; 74/527; 606/54, 59, 86 R, 606/157, 205, 207, 208, 324

See application file for complete search history.

(56) References Cited

U.S. PATENT DOCUMENTS

| | | | | |
|---|---|---|---|---|
| 2,631,585 A * | 3/1953 | Siebrandt | ............ | 606/86 R |
| 3,428,306 A * | 2/1969 | Harrison | ............ | 269/218 |
| 5,595,094 A * | 1/1997 | Negus | ............ | 81/3.44 |
| 5,624,454 A * | 4/1997 | Palti et al. | ............ | 606/151 |
| 5,730,033 A * | 3/1998 | Mitrowski | ............ | 81/53.11 |
| 5,885,036 A * | 3/1999 | Wheeler | ............ | 408/1 R |
| 6,015,128 A * | 1/2000 | Lombardi | ............ | 248/421 |
| 6,450,465 B1 * | 9/2002 | Eslick | ............ | 248/230.4 |
| 6,729,832 B1 * | 5/2004 | Word et al. | ............ | 414/729 |
| 7,294,140 B2 * | 11/2007 | Mosnier et al. | ............ | 606/206 |
| 7,678,124 B2 * | 3/2010 | Shifrin et al. | ............ | 606/157 |
| 2009/0088751 A1 * | 4/2009 | Mullaney | ............ | 606/59 |

* cited by examiner

*Primary Examiner* — Loha Ben

(74) *Attorney, Agent, or Firm* — The Marbury Law Group PLLC (57) ABSTRACT

An iris rod clamp, and lens drive motor mount using the clamp, is employed for attaching equipment such as lens motors to various movie/video cameras via the different sized iris rods used by these movie/video cameras. The clamp includes jaws with clamping surfaces that have multiple, parallel concave cylindrical profiles matching the different sizes of iris rods. The lens drive motor mount uses clamps and support arms with flat sides to keep alignment perpendicular to the lens. A D-clamp slides along a support arm to adjust location of the lens drive motor and a rosette rotates relative to the D-clamp to adjust angular position of the lens drive motor.

24 Claims, 6 Drawing Sheets

LENS DRIVE MOTOR MOUNT

RELATED APPLICATIONS

This application claims the benefit of U.S. Provisional Application Ser. No. 61/269,926, filed May 26, 2009, which is hereby incorporated by reference.

BACKGROUND OF THE INVENTION

When making movies and television shows, the camera lenses used during production will often use motor drives to control focus, T-stop, zoom focal length, etc. Currently, lens drive motors are attached to the iris rods (AKA lens support rods) of motion picture and video cameras via closed clamps that are sized to match one of various sizes of iris rods used by the various manufacturers to support lenses for motion picture and video cameras (e.g., Panaflex®, Arriflex®, Red One®, etc.). In order to install or remove such a mount with a closed clamp, it is often necessary to remove other items mounted on the iris rods, such as matte boxes. Furthermore, different cameras with different-sized diameters of iris rods, which can be 15 mm, 19 mm and ⅝"—depending on the manufacturer and model of camera, require the use of lens drive motor mounts with appropriately-sized closed clamps in 15 mm, 19 mm and ⅝" diameters. As such, this requires a camera rental company to maintain a large inventory of different sizes of clamps.

One attempt to address a similar problem with matte box mounts is found in U.S. Pat. No. 6,450,465 to Eslick, which discloses a multi-jaw clamp capable of attaching to various sized iris rods of a professional movie camera. The multi-jaw clamp includes two housings that each hold a cylinder with three circular sections in the sides of the cylinders that are rotatable to change the size of the circular opening for the iris rod to which the clamp can attach. The two housings contain hinge means for opening and closing the clamp and at each free end of the housings is a means for closing the clamp and locking the clamp in position around the iris rod. As such, a multi-jaw clamp can attach to three possible iris rod diameters with the same components. However, this design using inserts is mechanically complex and difficult to manufacture. The large and cumbersome design is also unsuited for mounting in tighter locations used for mounting some equipment.

What would be desirable is a simple, compact design for a lens drive motor mount that overcomes the problems with the prior art.

BRIEF SUMMARY OF THE INVENTION

The present invention provides improvements in the mounting of lens motor drives on the iris rods (AKA lens support rods) of motion picture and video cameras. Through use of an open clamp with multiple iris rod profiles formed in the surface, a single clamp may be used to mount lens motor drives to 15 mm, 19 mm and ⅝" iris rods, without the need to remove matte boxes, etc. The clamp can be spring-loaded to assist in operating and use hand-operable knobs to allow adjustment without tools. A pivot pin that attaches the jaws of the clamp via at least one elongated hole allow the jaws to self-center onto the various iris rod sizes. The lens drive motor mount uses clamps and support arms with flat sides to keep alignment perpendicular to the lens. A D-clamp slides along a support arm to adjust location of the lens drive motor and a rosette rotates relative to the D-clamp to adjust angular position of the lens drive motor.

DETAILED DESCRIPTION OF THE INVENTION

Disclosed embodiments will now be described with reference to the drawings. To facilitate the description, the same reference numbers will be used throughout the drawings to refer to the same or like parts wherever possible. References made to particular examples and implementations are for illustrative purposes, and are not intended to limit the scope of the invention or the claims.

As used herein, the term "iris rod" refers to any standard, cylindrical metal (typically stainless steel) lens support rods used on movie and video production cameras for supporting lenses, motors, matte boxes and/or filters; the term "rosette" refers to structures with rotationally-adjustable mounting plates as typically found on cameras and tripods; the term "D-clamp" refers to closed clamps that provide at least one flat surface to prevent rotation; the term "universal clamp" refers to embodiments of an iris rod clamp that can be used with various sizes of iris rods in accordance with the claimed embodiments; and the term "universal clamp assembly" refers to embodiments of an iris rod clamp and support arm.

Figure 1A:
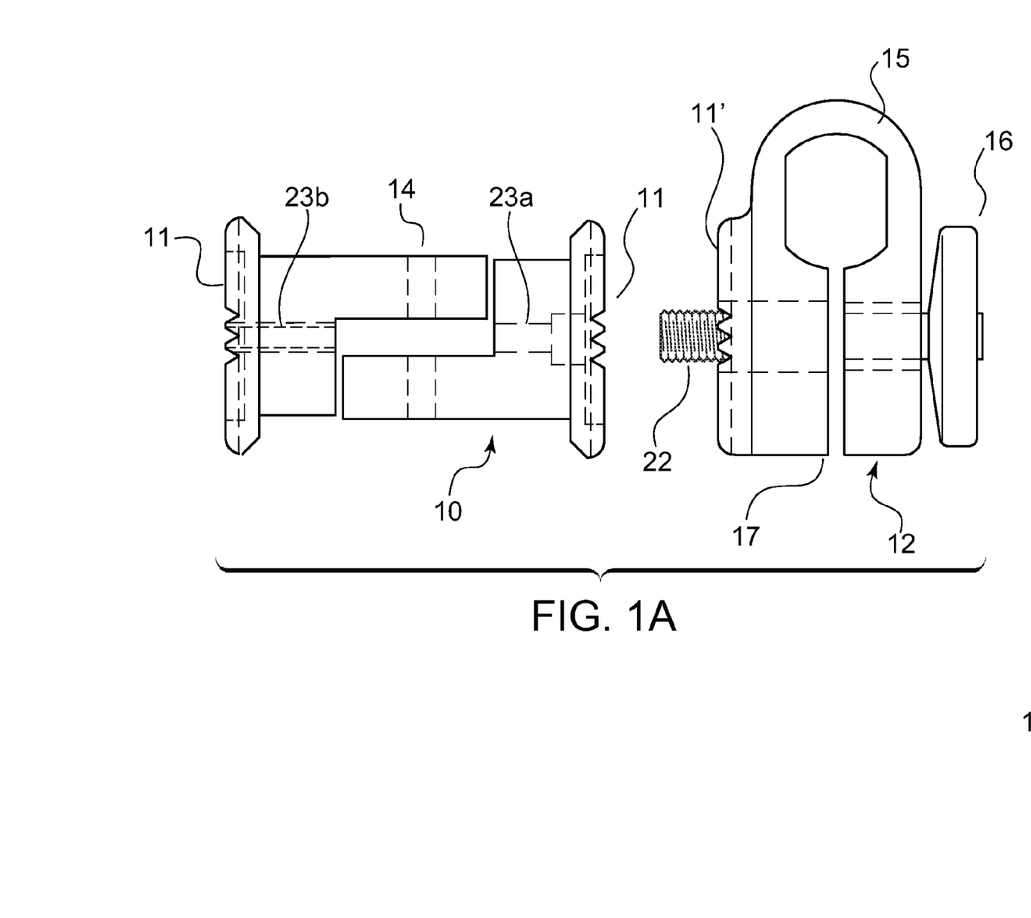
FIG. 1 illustrates various components of an embodiment of a lens drive motor mount in a disassembled state.
Figure 1B:
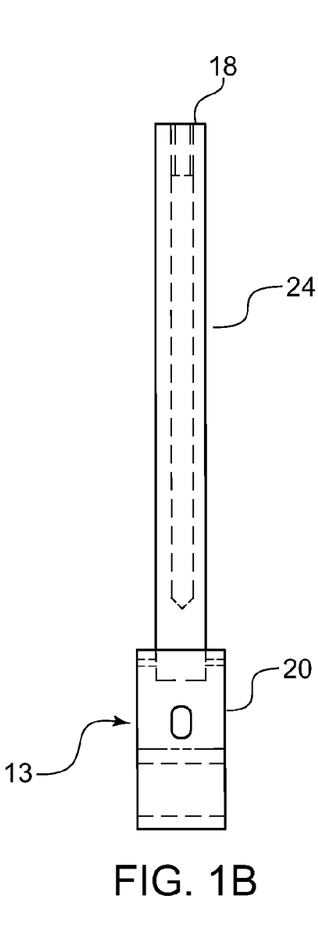
Figure 2:
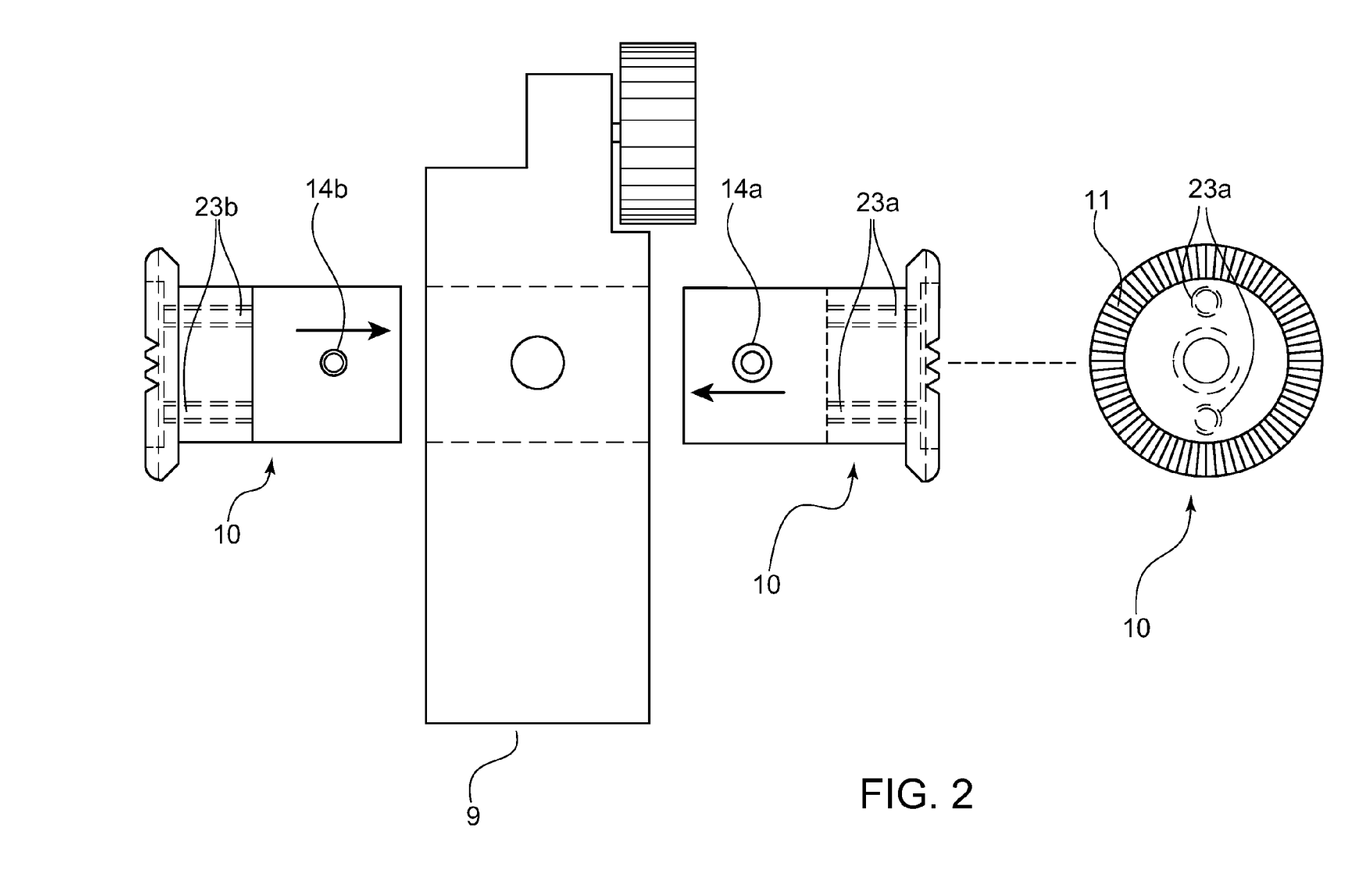
FIG. 2 illustrates an exploded view of rosette halves attaching to a lens motor in accordance with an embodiment.

FIGS. 1A and 2 illustrate a rosette 10 and a D-clamp 12 that combine with support arm 24 of universal clamp assembly 13 illustrated in FIG. 1B to provide an improved lens drive motor mount assembly for attaching devices such as motor 9, to cylindrical objects such as iris rods of varying sizes. A lens drive motor mount assembly may comprise four parts: rosette 10, D-clamp 12, support arm 24 of universal clamp assembly 13, and the universal clamp 20. The rosette 10 has two halves (i.e., a left side and a right side) that sandwich a motor 9 from both sides. The halves are secured by means of three screws. Two screws (not shown) through openings 23a and into threaded openings 23b pull the halves together and the third screw (not shown) is located on the top and goes through opening 14a in one-half, through a hole in motor 9, and threads into opening 14b of the other half, acting like a locating pin. The D-clamp 12 screws into a threaded hole on the rosette 10 by means of a clamping screw 22 attached to hand-operable knob 16. The same screw 22 also causes compression of the clamp opening 15 around the support arm 13 by a narrowing of gap 17 and clamps it into place.

Each rosette half includes a clamping surface 11 that mates with a similar surface 11' on D-clamp 12 to secure D-claim 12 at a particular desired angle. Preferably, surface 11 and the mating surface 11' on D-clamp 12 include rotationally-spaced serrations or teeth to allow the D-clamp 12 to rotate 360° on the rosette 10 in increments of 10° to mate to the lens gear. The serrations are located on both rosette halves on the sides of the motor 9 so the motor 9 can be rotated 180° for clearance reasons. In a preferred form, each clamping surface 11 and mating surface 11' has 60° serrations at 10° intervals 36×0.05 inches deep.

In use, operation of knob 16 can be used to position the D-clamp, and hence the motor 9, both along the length of support arm 24, and rotationally about rosette 10. Preferably, the clamp opening 15 and the support arm 24 have at least one flat surface for precise perpendicular alignment relative to the iris rod/camera lens. More preferably, the clamp opening 15 has parallel flat surfaces that are perpendicular to the lens and the support arm 24 is square or rectangular in cross section. The support arm 24 can be hollowed out to save weight and can include a tapped hole 18 for the mounting of a witness camera or for the mounting of a stop to prevent D-clamp 12 from sliding off the support arm 24.

Figure 3:
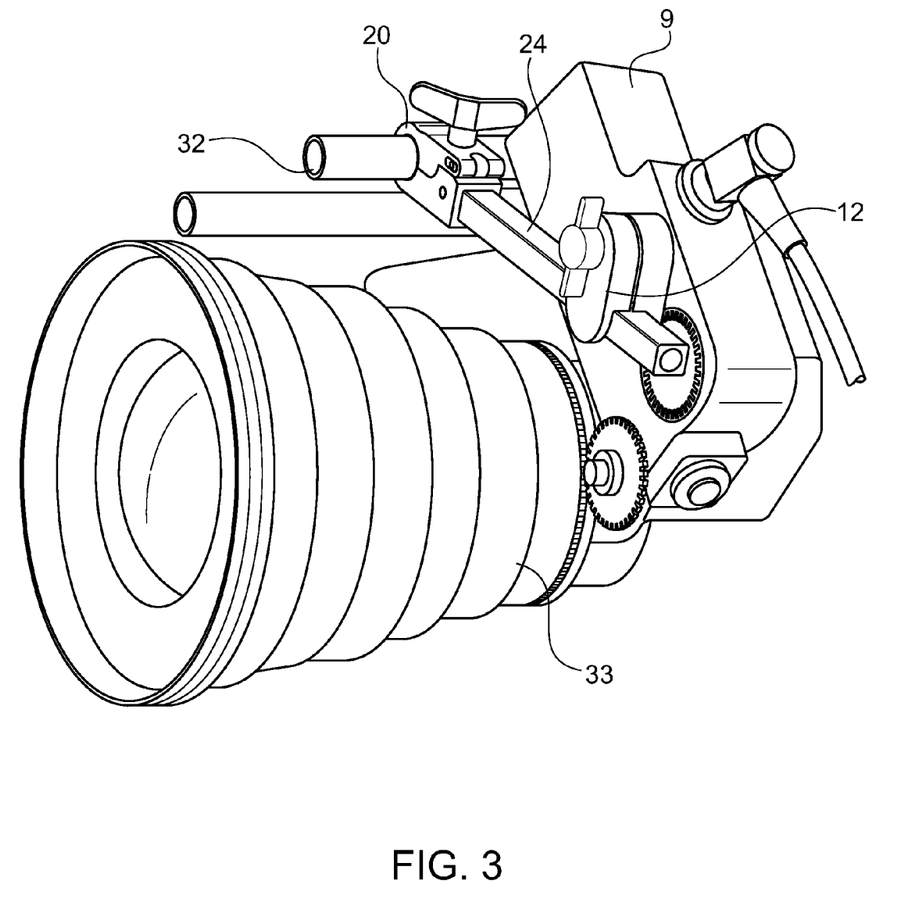
FIG. 3 illustrates an embodiment of a lens drive motor mount in position on a camera.

As illustrated in FIG. 3, a universal clamp 20 is mounted to an iris rod 32. Support arm 24 is attached to universal clamp 20 and extends therefrom so as to mount a lens drive motor 9 via D-clamp 12 for driving lens 33. Universal clamp 20 can be mounted at any angle perpendicular to iris rod 32, D-clamp 12 can be variously positioned along support arm 24, and motor 9 rotated about D-clamp 12 so as to mount the lens drive motor in a flexible manner. As discussed below, the universal clamp 20 may mount onto various sized iris rods of professional motion picture and video cameras to support devices, such as lens drive motor 9.

Figure 4A:
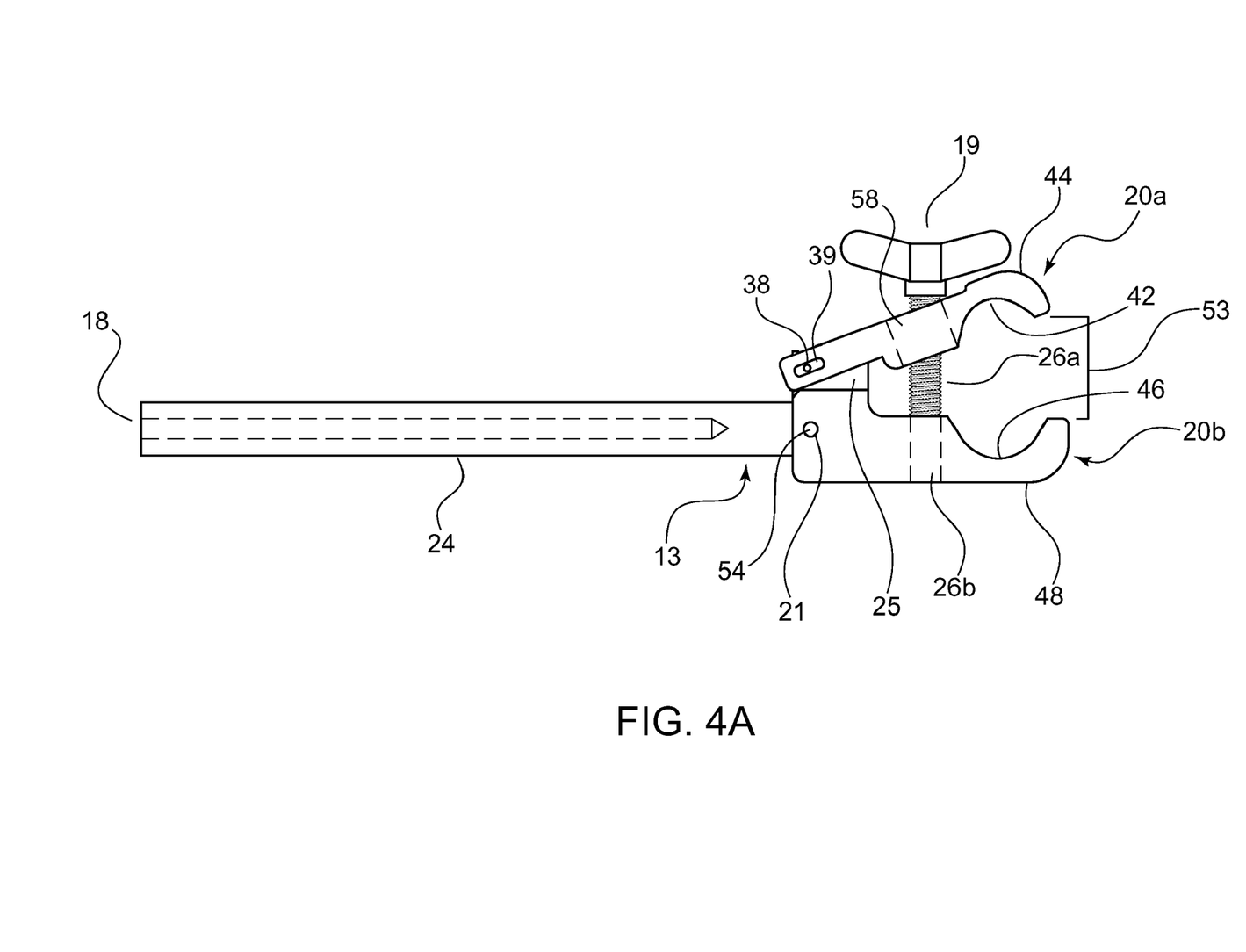
FIG. 4A illustrates an embodiment of a clamp assembly.

FIG. 4A illustrates an embodiment the universal clamp assembly 13. The universal clamp 20 may have a first jaw 20a and a second jaw 20b. The first jaw 20a includes an outer surface 44 and an inner clamping surface 42 with at least two parallel concave cylindrical profiles formed therein. As illustrated, the concave cylindrical profiles are nested with a smaller profile formed within a larger profile, although other, non-nested arrangements are also possible and within the skill of one in the art. Similarly, the second jaw 20b includes an outer surface 48 and an inner clamping surface 46 with at least two parallel concave cylindrical profiles that mirror/match the surface 42 formed therein.

The second jaw 20b includes a cavity for retaining one end of support arm 24. A hole 21 in second jaw 20b accepts pin or setscrew 54 to secure support arm 24 to the universal clamp 20 to form the universal clamp assembly 13. The second jaw 20b further includes a boss 25 that secures pivot pin 38. Elongated openings (ellipsoids) 39 are formed on first jaw 20a and interact with pivot pin 38 to pivotally connect the first jaw 20a to the second jaw 20b.

A first end of a threaded retainer means 26b is positioned between and adjacent to the boss 25 and the clamping surface 46. In a preferred form, means 26b is a threaded hole, but a threaded stud could also be used. An elongated hole 58 is positioned above means 26b on first jaw 20a. A second end of a threaded retainer means 26a connects to means 26b through the elongated hole so as to clamp the first and second jaws 20a and 20b together. In a preferred form, means 26a is a threaded stud with a knob 19. In use, threaded stud 26a is fed through the elongated hole 58 and screwed into threaded hole 26b. In an open position, an opening 53 between the jaws should be sufficiently large to accept the largest anticipated iris rod size. In this manner, an "open" clamp is provided such that other items mounted to the iris rod do not need to be removed in order to install and remove the universal clamp assembly 13. Upon rotation of knob 19, a shoulder on knob 19 applies force to the exterior surface 44 of the first jaw 20a so as to clamp the two jaws together.

The elongated openings 39 and the elongated hole 58 allow first jaw 20a to open wide when open and to float and self-center surface 42 when closed and clamped onto an iris rod.

Figures 4B, 4C:
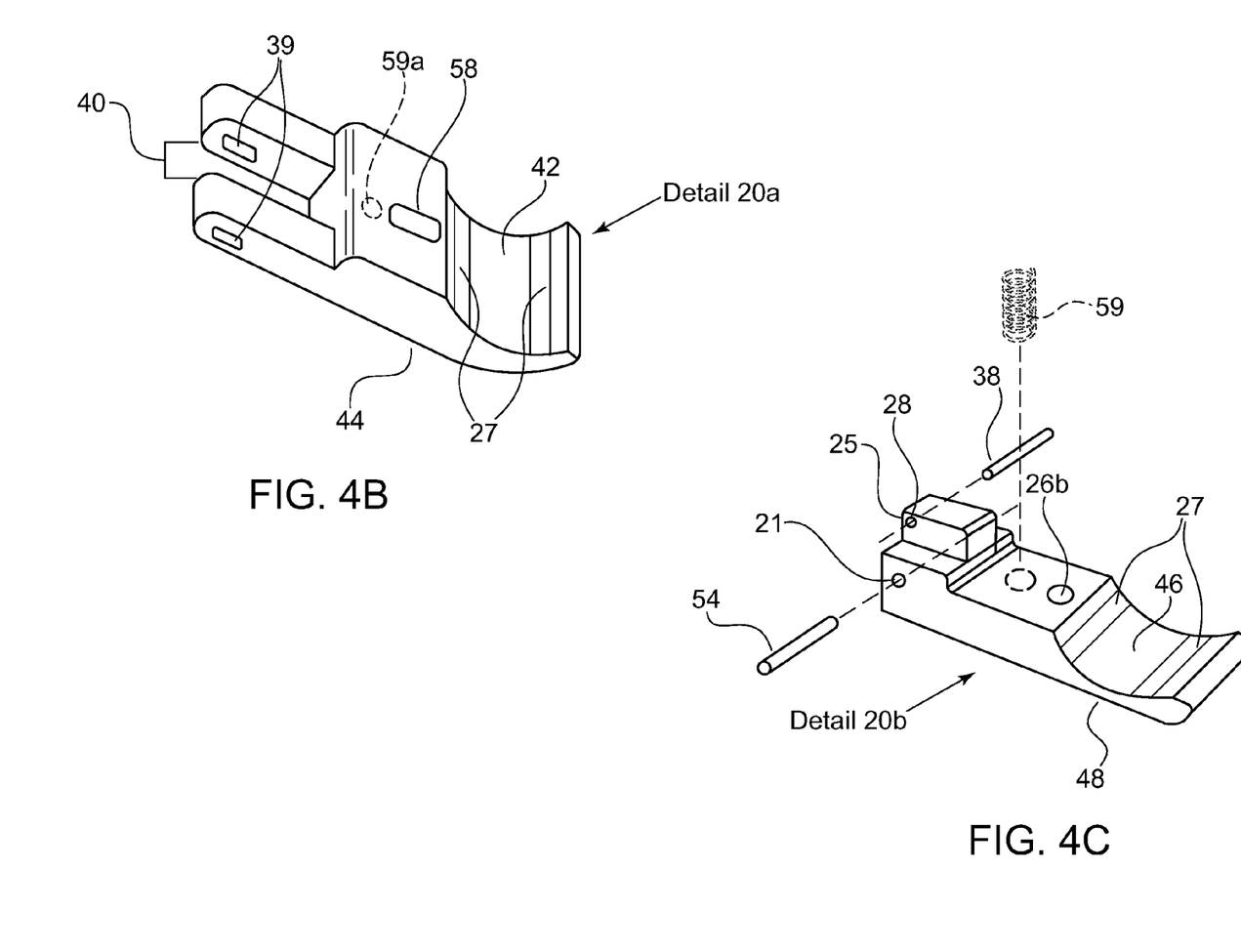
FIG. 4B illustrates details of an embodiment of a disassembled clamp.
FIG. 4C is an exploded view of a portion of a disassembled clamp.

Details of first jaw 20a are illustrated in FIG. 4B. As shown in this figure, surface 42 can have a central nested profile with a smaller diameter within a profile 27 with a larger diameter. Additionally, the elongated holes 39 are mounted on a receiver portion 40. The receiver portion 40 is dimensioned with a spaced opening or cutout to accommodate tongue portion (boss) 25 of the second jaw 20b between the elongated openings 39. The inner portion of first jaw 20a can optionally include a means 59a for attachment of an optional spring 59 so as to spring-load the jaws. While illustrated as a hole for a coil spring, other types of springs and retainers will be understood as usable by one of skill in the art.

Details of second jaw 20b are illustrated in FIG. 4C. As shown in this figure, surface 46 can have a central nested profile with a smaller diameter within a profile 27 with a larger diameter, so as to match the clamping surface of the first jaw 20a. The inner portion of second jaw 20b can optionally include a means 59b for attachment of an optional spring 59 so as to spring-load the jaws. While illustrated as a hole for a coil spring, other types of springs and retainers will be understood as usable by one of skill in the art. In use, the second jaw 20b is secured to the first jaw 20a by insertion of pivot pin 38 into hole 28 and secured to the support arm 24 by insertion of a set screw 54 into hole 21.

Figure 5:
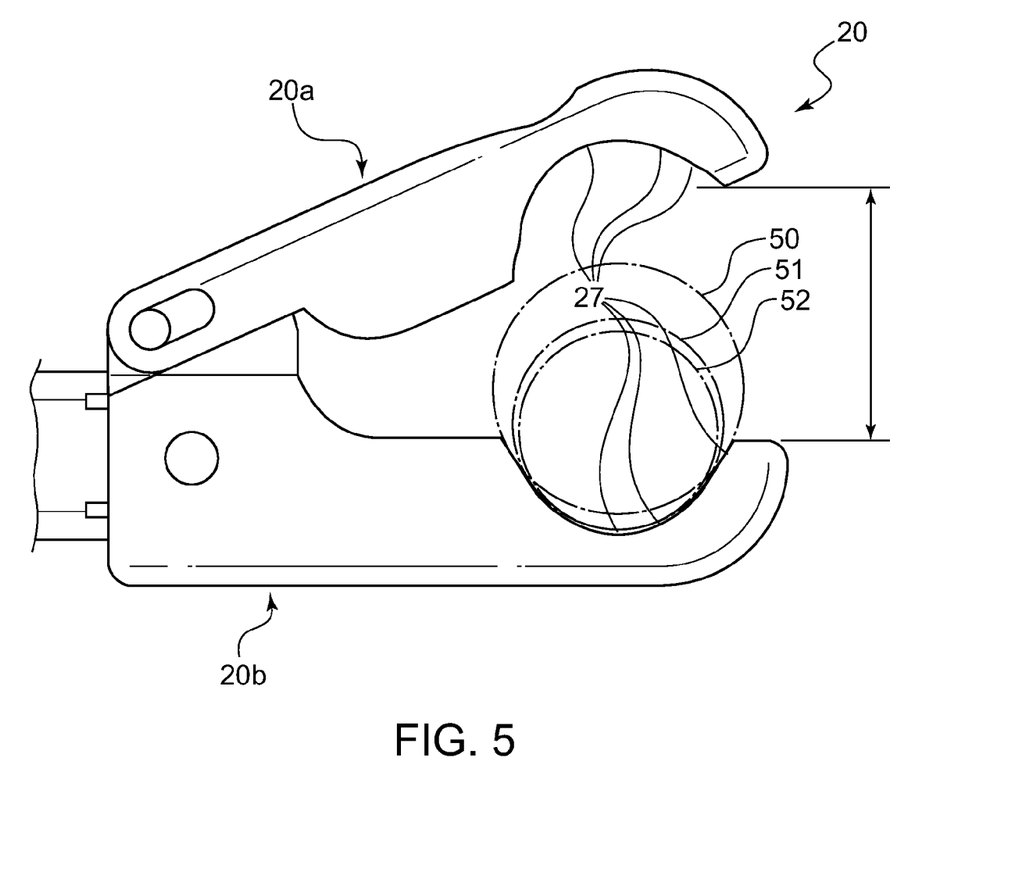
FIG. 5 illustrates a detailed view of an embodiment of the jaw portions of a clamp.

FIG. 5 illustrates a preferred embodiment of the universal clamp 20, wherein the clamping surfaces of each of first and second jaws 20a and 20b include nested, parallel, cylindrical profiles 27 formed therein to accommodate 19 mm iris rod 50, ⅝" (15.875 mm) iris rod 51, and 15 mm iris rod 52.

Embodiments disclosed herein can mount onto different sizes of iris rods to allow devices to be attached and removed without any need to change other items secured to the iris rods. The universal clamp 20 self-adjusts to the diameter of the iris rods 32. The knob 19 is screwed down to secure to the iris rod. The jaws can be spring loaded so when the knob 19 is loosened the jaws spread apart and the clamp can be removed quickly and ready to be installed onto a different size iris rod. The support shaft 24 of the universal clamp 13 can be swapped out (via hole 21 and shaft/screw 54) for different lengths of support arms 24.

The universal clamp is preferably formed from a metal such as stainless steel and the clamping surfaces are preferably formed by machining the surfaces with tooling matching the iris rod sizes, although forging, casting, etc. are also possible. The depth of the concavity should be less than the radius of the smallest iris rod diameter In a first embodiment, an iris rod clamp comprises a first jaw with a first clamping surface with at least two parallel concave cylindrical profiles formed therein, a second jaw pivotally mounted to the first jaw, the second jaw comprising a second clamping surface with at least two parallel concave cylindrical profiles matching the first clamping surface formed therein, wherein the concave cylindrical profiles of the first and second clamping surfaces comprise smaller diameter profiles nested within larger diameter profiles. In one preferred version of this first embodiment, the concave cylindrical profiles of the first and second clamping surfaces comprise diameters of 15 mm, 19 mm and ⅝". Preferably, this embodiment comprises a means for pivotally mounting the second jaw to the first jaw that has an elongation to allow one of the jaws to adjust relative to the other jaw to accommodate clamping on various iris rod diameters. In a preferred form, a spring is mounted in compression between the first and second jaws.

In another embodiment, a lens drive motor mount assembly comprises a pair of rosette halves for engaging a lens drive motor; a support arm; a D-clamp that includes a surface for engaging one of the rosette halves, a clamp opening for engaging the support arm, and a threaded fastener for securing the D-clamp to the rosette and tightening the clamp opening on the support arm; and an iris rod clamp that comprises a first jaw with a first clamping surface with at least two parallel concave cylindrical profiles formed therein, a second jaw pivotally mounted to the first jaw and including a second clamping surface with at least two parallel concave cylindrical profiles matching the first clamping surface formed therein, wherein the concave cylindrical profiles of the first and second clamping surfaces comprise smaller diameter profiles nested within larger diameter profiles. In one preferred version of this embodiment, the concave cylindrical profiles of the first and second clamping surfaces comprise diameters of 15 mm, 19 mm and ⅝". Preferably, the embodiment comprises a means for pivotally mounting the second jaw to the first jaw that has an elongation to allow one of the jaws to adjust relative to the other jaw to accommodate clamping on various iris rod diameters. In a preferred form, a spring is mounted in compression between the first and second jaws.

In a further embodiment, a clamp comprises a first jaw comprising: a first clamping surface with at least two parallel concave cylindrical profiles formed therein, an elongated hole perpendicular to and adjacent the first clamping surface, and a receiver portion adjacent the elongated hole with an elongated retaining hole parallel to an axis of the concave cylindrical profiles. The clamp further includes a second jaw, the second jaw comprising: a second clamping surface with at least two parallel concave cylindrical profiles matching the first clamping surface formed therein, a first end of a threaded retainer adjacent the second clamping surface and aligned with the elongated hole of the first jaw, a tongue portion adjacent the threaded retainer with a circular retaining hole parallel to an axis of the concave cylindrical profiles and aligned with the elongated retaining holes of the first jaw; and means for retaining a support arm in an end of the second jaw adjacent the tongue portion. A pivot pin engages the elongated retainer hole of the first jaw and the circular retaining hole of the second jaw to pivotally connect the first and seconds jaws, and a second end of the threaded retainer is employed for engaging the first end of the threaded retainer and applying a clamping force between the first jaw and the second jaw through the elongated hole of the first jaw. Preferably, the first end of the threaded retainer comprises a threaded hole and the second end of the threaded retainer comprises a threaded rod with a shoulder and a hand-operable knob. In another variation of this embodiment, the receiver portion of the first jaw comprises a cutout portion for the tongue of the first jaw and a pair of elongated retaining holes. The means for retaining a support arm can employ a cavity and a perpendicular set screw. In preferred embodiments, the concave cylindrical profiles of the first and second clamping surfaces comprise diameters matching two or more iris rod diameters, the concave cylindrical profiles of the first and second clamping surfaces comprise smaller diameter profiles nested within larger diameter profiles, and/or the concave cylindrical profiles of the first and second clamping surfaces comprise diameters of 15 mm, 19 mm and ⅝". In a preferred form, a spring is mounted in compression between the first and second jaws.

In yet another embodiment, a lens drive motor mount assembly comprises: a pair of rosette halves for engaging a lens drive motor; a support arm; a D-clamp that comprises: a surface for engaging one of the rosette halves, a clamp opening for engaging the support arm, and a threaded fastener for securing the D-clamp to the rosette and tightening the clamp opening on the support arm; and an iris rod clamp that includes a first jaw, the first jaw comprising: a first clamping surface with at least two parallel concave cylindrical profiles formed therein, an elongated hole perpendicular to and adjacent the first clamping surface, and a receiver portion adjacent the elongated hole with an elongated retaining hole parallel to an axis of the concave cylindrical profiles. The iris rod clamp further includes a second jaw, the second jaw comprising: a second clamping surface with at least two parallel concave cylindrical profiles matching the first clamping surface formed therein, a first end of a threaded retainer adjacent the second clamping surface and aligned with the elongated hole of the first jaw, a tongue portion adjacent the threaded retainer with a circular retaining hole parallel to an axis of the concave cylindrical profiles and aligned with the elongated retaining holes of the first jaw; means for retaining an end of the support arm in an end of the second jaw adjacent the tongue portion. The iris rod clamp further includes a pivot pin engaging the elongated retainer hole of the first jaw and the circular retaining hole of the second jaw to pivotally connect the first and seconds jaws, and a second end of the threaded retainer for engaging the first end of the threaded retainer and applying a clamping force between the first jaw and the second jaw through the elongated hole of the first jaw.

Preferably in this embodiment, the first end of the threaded retainer comprises a threaded hole and the second end of the threaded retainer comprises a threaded rod with a shoulder and a hand-operable knob. In another variation of this embodiment, the receiver portion of the first jaw comprises a cutout portion for the tongue of the first jaw and a pair of elongated retaining holes. The means for retaining a support arm can employ a cavity and a perpendicular set screw. In preferred embodiments, the concave cylindrical profiles of the first and second clamping surfaces comprise diameters matching two or more iris rod diameters, the support arm and clamp opening for the support arm include at least one flat surface for precise alignment of the iris rod clamp, the rosette halves include a surface for precise rotational adjustment, and the concave cylindrical profiles of the first and second clamping surfaces comprise smaller diameter profiles nested within larger diameter profiles, and/or the concave cylindrical profiles of the first and second clamping surfaces comprise diameters of 15 mm, 19 mm and ⅝". In a preferred form, a spring is mounted in compression between the first and second jaws.

An iris rod clamp and a lens drive motor mount that can be used with various sized iris rods has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:
1. An iris rod clamp, comprising:
   a first jaw, the first jaw comprising:
      a first clamping surface with at least two parallel concave cylindrical profiles formed therein,
   a second jaw pivotally mounted to the first jaw, the second jaw comprising:
      a second clamping surface with at least two parallel concave cylindrical profiles matching the first clamping surface formed therein, wherein the concave cylindrical profiles of the first and second clamping surfaces comprise smaller diameter profiles nested within larger diameter profiles.

2. The iris rod clamp of claim 1, wherein the concave cylindrical profiles of the first and second clamping surfaces comprise diameters of 15 mm, 19 mm and ⅝".

3. The iris rod clamp of claim 1, wherein a means for pivotally mounting the second jaw to the first jaw comprises an elongation that allows one of the jaws to adjust relative to the other jaw to accommodate clamping on various iris rod diameters.

4. The iris rod clamp of claim 1, further comprising a spring mounted in compression between the first and second jaws.

5. A lens drive motor mount assembly, comprising:
    a pair of rosette halves for engaging a lens drive motor;
    a support arm;
    a D-clamp comprising:
        a surface for engaging one of the rosette halves;
        a clamp opening for engaging the support arm; and
        a threaded fastener for securing the D-clamp to the one of the rosette halves and tightening the clamp opening on the support arm; and
    an iris rod clamp, comprising:
        a first jaw, the first jaw comprising:
            a first clamping surface with at least two parallel concave cylindrical profiles formed therein,
        a second jaw pivotally mounted to the first jaw, the second jaw comprising:
            a second clamping surface with at least two parallel concave cylindrical profiles matching the first clamping surface formed therein,
            wherein the concave cylindrical profiles of the first and second clamping surfaces comprise smaller diameter profiles nested within larger diameter profiles.

6. The lens drive motor mount assembly of claim 5, wherein the concave cylindrical profiles of the first and second clamping surfaces comprise diameters of 15 mm, 19 mm and ⅝".

7. The lens drive motor mount assembly of claim 5, wherein a means for pivotally mounting the second jaw to the first jaw comprises an elongation that allows one of the jaws to adjust relative to the other to accommodate clamping on various iris rod diameters.

8. The lens drive motor mount assembly of claim 5, further comprising a spring mounted in compression between the first and second jaws.

9. A clamp, comprising:
    a first jaw, the first jaw comprising:
        a first clamping surface with at least two parallel concave cylindrical profiles formed therein,
        an elongated hole perpendicular to and adjacent the first clamping surface, and
        a receiver portion adjacent the elongated hole the receiver portion having two elongated retaining holes aligned in a direction parallel to an axis of the concave cylindrical profiles;
    a second jaw, the second jaw comprising:
        a second clamping surface with at least two parallel concave cylindrical profiles matching the first clamping surface formed therein,
        a first end of a threaded retainer adjacent the second clamping surface and aligned with the elongated hole of the first jaw,
        a tongue portion adjacent the threaded retainer with a circular retaining hole parallel to an axis of the concave cylindrical profiles and aligned with the elongated retaining holes of the first jaw; and
        means for retaining a support arm in an end of the second jaw adjacent the tongue portion;
    a pivot pin engaging the elongated retaining holes of the first jaw and the circular retaining hole of the second jaw to pivotally connect the first and second jaws; and
    a second end of the threaded retainer for engaging the first end of the threaded retainer and applying a clamping force between the first jaw and the second jaw through the elongated hole of the first jaw.

10. The clamp of claim 9, wherein the first end of the threaded retainer comprises a threaded hole and the second end of the threaded retainer comprises a threaded rod with a shoulder and a hand-operable knob.

11. The clamp of claim 9, wherein the receiver portion of the first jaw comprises a cutout portion for accommodating the tongue portion of the second jaw and the two elongated retaining holes.

12. The clamp of claim 9, wherein the means for retaining a support arm comprises a cavity and a set screw.

13. The clamp of claim 9, wherein the concave cylindrical profiles of the first and second clamping surfaces comprise diameters matching two or more iris rod diameters.

14. The clamp of claim 9, further comprising a spring mounted in compression between the first and second jaws.

15. The clamp of claim 14, wherein the concave cylindrical profiles of the first and second clamping surfaces comprise diameters of 15 mm, 19 mm and ⅝".

16. The clamp of claim 9, wherein the concave cylindrical profiles of the first and second clamping surfaces comprise smaller diameter profiles nested within larger diameter profiles.

17. A lens drive motor mount assembly, comprising:
    a pair of rosette halves for engaging a lens drive motor;
    a support arm;
    a D-clamp comprising:
        a surface for engaging one of the rosette halves;
        a clamp opening for engaging the support arm; and
        a threaded fastener for securing the D-clamp to the one of the rosette halves and tightening the clamp opening on the support arm; and
    an iris rod clamp, comprising:
        a first jaw, the first jaw comprising:
            a first clamping surface with at least two parallel concave cylindrical profiles formed therein,
            an elongated hole perpendicular to and adjacent the first clamping surface, and
            a receiver portion adjacent the elongated hole the receiver portion having two elongated retaining holes aligned in a direction parallel to an axis of the concave cylindrical profiles;
        a second jaw, the second jaw comprising:
            a second clamping surface with at least two parallel concave cylindrical profiles matching the first clamping surface formed therein,
            a first end of a threaded retainer adjacent the second clamping surface and aligned with the elongated hole of the first jaw,
            a tongue portion adjacent the threaded retainer with a circular retaining hole parallel to an axis of the concave cylindrical profiles and aligned with the elongated retaining holes of the first jaw;
            means for retaining an end of the support arm in an end of the second jaw adjacent the tongue portion;

a pivot pin engaging the elongated retaining holes of the first jaw and the circular retaining hole of the second jaw to pivotally connect the first and second jaws; and a second end of the threaded retainer for engaging the first end of the threaded retainer and applying a clamping force between the first jaw and the second jaw through the elongated hole of the first jaw.

18. The lens drive motor mount assembly of claim 17, wherein the first end of the threaded retainer comprises a threaded hole and the second end of the threaded retainer comprises a threaded rod with a shoulder and a hand-operable knob.

19. The lens drive motor mount assembly of claim 17, wherein the receiver portion of the first jaw comprises a cutout portion for accommodating the tongue portion of the second jaw and the two elongated retaining holes.

20. The lens drive motor mount assembly of claim 17, wherein the means for retaining a support arm comprises a cavity and a set screw.

21. The lens drive motor mount assembly of claim 17, wherein the support arm and clamp opening for the support arm include at least one flat surface for precise alignment of the iris rod clamp, and the rosette halves include a surface for precise rotational adjustment.

22. The lens drive motor mount assembly of claim 17, further comprising a spring mounted in compression between the first and second jaws.

23. The lens drive motor mount assembly of claim 17, wherein the concave cylindrical profiles of the first and second clamping surfaces comprise diameters matching two or more iris rod diameters, with smaller diameter profiles nested within larger diameter profiles.

24. The lens drive motor mount assembly of claim 23, wherein the concave cylindrical profiles of the first and second clamping surfaces comprise diameters of 15 mm, 19 mm and ⅝".

* * * * *